(12) United States Patent
Kim

(10) Patent No.: US 10,267,067 B2
(45) Date of Patent: Apr. 23, 2019

(54) APPARATUS FOR PREVENTING VEHICLE DOOR HAVING OUTSIDE HANDLE FROM OPENING

(71) Applicant: HYUNDAI MOTOR COMPANY, Seoul (KR)

(72) Inventor: Chang Dong Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 832 days.

(21) Appl. No.: 14/840,870

(22) Filed: Aug. 31, 2015

(65) Prior Publication Data

US 2016/0108646 A1  Apr. 21, 2016

(30) Foreign Application Priority Data

Oct. 17, 2014 (KR) .................... 10-2014-0140466

(51) Int. Cl.
| | |
|---|---|
| *E05B 77/06* | (2014.01) |
| *E05B 79/20* | (2014.01) |
| *B62L 3/02* | (2006.01) |
| *G05G 1/04* | (2006.01) |
| *E05B 85/14* | (2014.01) |

(52) U.S. Cl.
CPC ............ *E05B 77/06* (2013.01); *E05B 79/20* (2013.01); *B62L 3/02* (2013.01); *E05B 85/14* (2013.01); *G05G 1/04* (2013.01); *Y10S 292/22* (2013.01)

(58) Field of Classification Search
CPC .......... Y10S 292/22; B62L 3/02; B62L 3/026; G05G 1/04; E05B 77/06; E05B 79/20

USPC ....................................................... 292/336.3
See application file for complete search history.

(56) References Cited

U.S. PATENT DOCUMENTS

| | | | | |
|---|---|---|---|---|
| 6,705,178 B1 * | 3/2004 | Grandjean | .......... | E05B 17/0004 |
| | | | | 292/336.3 |
| 7,232,164 B2 * | 6/2007 | Lee | .......... | E05B 77/06 |
| | | | | 292/336.3 |
| 7,635,151 B2 * | 12/2009 | Rodawold, Jr. | ......... | E05B 77/06 |
| | | | | 292/336.3 |
| 8,152,209 B2 * | 4/2012 | Lee | .......... | E05B 77/06 |
| | | | | 292/336.3 |

(Continued)

FOREIGN PATENT DOCUMENTS

| | | | | |
|---|---|---|---|---|
| DE | 102008032324 A1 * | 1/2010 | ............. | E05B 77/06 |
| DE | 102013007819 A1 * | 10/2013 | ............. | E05B 77/06 |

(Continued)

*Primary Examiner* — Carlos Lugo
(74) *Attorney, Agent, or Firm* — Morgan Lewis & Bockius LLP

(57) ABSTRACT

An apparatus for preventing a vehicle door from opening includes an outside handle having a pulling lever which extends from the outside handle into a housing. A release cable protector case is hingedly connected to an upper side of the housing to pivot. A release cable is connected to a lower side of the release cable protector case to be pulled. A handle associated lever includes a rotary shaft which is pivotally attached to a lower side of the housing, a locking lever which extends from the rotary shaft and is in contact with an outer surface of the pulling lever, and a cable-operating lever which is connected to an edge of the locking lever and pulls the release cable. A first return spring surrounds the rotary shaft of the handle-associated lever and has one end fixed to the rotary shaft and another end fixed to the housing.

5 Claims, 5 Drawing Sheets

(56) References Cited

U.S. PATENT DOCUMENTS

| | | | | |
|---|---|---|---|---|
| 8,376,424 B2* | 2/2013 | Bejune | ............... | E05B 77/04 |
| | | | | 292/336.3 |
| 8,899,640 B2* | 12/2014 | Bertolotti Potachin | ................ | |
| | | | | E05B 77/06 |
| | | | | 292/336.3 |
| 9,611,675 B2* | 4/2017 | Wittelsbuerger | ....... | E05B 77/02 |
| 9,695,614 B2* | 7/2017 | Jeong | ............... | E05B 1/0038 |
| 2016/0060913 A1* | 3/2016 | Kim | ............ | E05B 77/06 |
| | | | | 292/336.3 |

FOREIGN PATENT DOCUMENTS

| | | |
|---|---|---|
| JP | 2009-243102 A | 10/2009 |
| KR | 1996-0017337 U | 6/1996 |
| KR | 10-2008-0055439 A | 6/2008 |
| KR | 10-2011-0032508 A | 3/2011 |
| KR | 10-2011-0135548 A | 12/2011 |
| KR | 10-1360337 B1 | 2/2014 |
| KR | 10-2014-0052492 A | 5/2014 |
| WO | WO-2007042086 A1 * 4/2007 ............ E05B 77/06 |

\* cited by examiner

-- Related Art --

-- Related Art --

-- Related Art --

-- Related Art --

APPARATUS FOR PREVENTING VEHICLE DOOR HAVING OUTSIDE HANDLE FROM OPENING

CROSS-REFERENCE TO RELATED APPLICATION

This application claims under 35 U.S.C. § 119(a) the benefit of priority to Korean Patent Application No. 10-2014-0140466 filed on Oct. 17, 2014, the entire content of which is incorporated herein by reference.

TECHNICAL FIELD

The present disclosure relates to an apparatus for prevention a vehicle door from opening. More particularly, the present disclosure relates to an apparatus for preventing a vehicle door having an outside handle from opening when the outside handle pivots in an opening direction due to an inertia force during side collision.

BACKGROUND

In general, an outside handle for a vehicle door is to open and close the vehicle door, and an inside handle is mounted at an inner side of the vehicle door. A door latch assembly, which locks or releases by a remote controller, a key, and the like, is installed in a door panel.

When a user presses a button on the remote controller to open a door, a solenoid of a door latch receives a signal from the remote controller and moves in an opening direction of the door. Then, the door latch is released, and the user pulls an outside vehicle door handle in the opening direction to open a vehicle door.

In a case of a side collision of a vehicle, an inertia force applied to the outside handle may lift the outside handle in the opening direction, such that the door may open, which insecure a passenger. Thus, the door needs to be prevented from opening at the side collision.

Hereinafter, an existing apparatus for preventing a door from opening at a side collision and operations thereof will be described.

FIGS. 1 and 2 are perspective views showing an existing apparatus for preventing a door from opening, and FIGS. 3 and 4 are views operations of an apparatus for preventing a door from opening.

Referring to FIGS. 1 and 2, the apparatus for preventing a door from opening includes an outside handle 10 and an outside handle housing 20 (hereinafter, referred to as 'a housing').

The outside handle 10 is mounted to an outer side of the housing 20. A pulling lever 12 integrally is connected to the outside handle 10 and extends into the housing 20.

The housing 20 further includes a handle lever 30 pivoting by a return spring 38 to return the outside handle 10 to an original position when the outside handle 30 is pulled.

Here, a locking lever 32 connected with an outer surface of the pulling lever 12 protrudes on the top of the handle lever 30. The handle lever 30 has a balance weight 34 at a lower side thereof to return the outside handle 10 to the original position when the outside handle 10 is pulled.

In addition, a release cable 36, which extends from a door latch assembly (not shown) for locking and releasing a door, is connected to a front end of the handle lever 30.

Thus, the handle lever 30 pivots counterclockwise entirely as the pulling lever 12 pulls the locking lever 32 of the handle lever 30 when pulling the outside handle 10.

At this time, as a user further pulls the outside handle 10 by his/her hand to pull the release cable 36 which is fixed to the front end of the handle lever 30, the door is open. Simultaneously, the door latch assembly releases the locked door as the handle lever 30 pivots counterclockwise.

In general, the door may be open by an inertia force during side collision. That is, the door may be open at the side collision as the outside handle 10 is pulled in an opening direction by which the inertia force is applied to the outside handle 10.

The balance weight 34 prevents the door from opening primarily during the side collision.

As shown in FIG. 1, when a normal directional inertia is applied not only to the outside handle 10 (indicated by an arrow 'A' in FIG. 1) but to the balance weight 34 (indicated by an arrow 'B' in FIG. 1) during the side collision, the outside handle 10 is not pulled in the opening direction when the inertia force applied to the balance weight 34 is greater than the inertia force applied to the outside handle 10, thus preventing the door from opening.

However, when a reverse directional inertia force (in the direction opposite to the arrow 'B' in FIG. 1) is applied after the forward inertial force is applied to the balance weight 34 at the side collision, the handle lever 30 pivots counterclockwise entirely to pull the release cable 36 to open the door by the door releasing operation of the door latch assembly.

When a resilient force of the return spring 38, which surrounds a rotary shaft of the handle lever 30, increases, the reverse inertia force applied to the balance weight 34 may decrease. As the resilient force of the return spring 38 increases, an operative force when a user pulls the outside handle 10 remarkably increases at a normal door opening condition, user may find the operation inconvenient.

Thus, since there is weight and mass limitation on the balance weight 34, a blocking lever 40 is mounted to the housing 20 to further prevent the door from opening at the side collision.

The blocking lever 40 has a hinge end 42 (see FIG. 4) at one side pivotally mounted in the housing 10 by the return spring 38 and has a saw tooth-shaped stopper 44 at another side to restrain a locking step 14 formed on an end of the pulling lever 12 of the outside handle 10.

Referring to FIGS. 3 and 4, when the pulling lever 12 of the outside handle 10 is pulled out by a forward inertia force (indicated by the arrow "C" in FIG. 3), the blocking lever 40 pivots in the same direction due to the forward inertia force. Simultaneously, the stopper 44 of the blocking lever 40 retrains the locking step 14 at an end of the pulling lever 12 to prevent the outside handle 10 from being pulled in the opening direction and the door from opening.

However, when an outer panel of the door can be excessively deformed at the side collision, and outside handle 10 is offset from a normal operation path, the door opening prevention by the blocking lever 40 is not effective.

SUMMARY OF THE DISCLOSURE

The present disclosure has been made in an effort to solve the above-mentioned problems, and an aspect of the present inventive concept provides an apparatus for preventing a vehicle door having an outside handle from opening at a side collision by a simple structure without pulling a release cable even when the outside handle is pulled by a forward inertia force applied at the side collision and preventing the door from opening using a reverse inertia force.

In accordance with an embodiment of the present inventive concept, an apparatus for preventing a vehicle door from opening includes an outside handle having a pulling lever which extends from the outside handle into a housing. A release cable protector case is hingedly connected to an upper side of the housing to pivot. A release cable is connected to a lower side of the release cable protector case to be pulled. A handle-associated lever includes a rotary shaft which is pivotally attached to a lower side of the housing to pivot, a locking lever which extends from the rotary shaft and is in contact with an outer surface of the pulling lever, and a cable-operating lever which is connected to an edge of the locking lever and pulls the release cable. A first return spring surrounds the rotary shaft of the handle-associated lever and has one end fixed to the rotary shaft and another end fixed to the housing.

The apparatus may further include a second return spring surrounding a hinge shaft of the release cable protector case having a resilient return force less than that of the first return spring to provide an inward resilient force to the lower side of the release cable protector case.

The apparatus may further include a cable fixing body, to which the release cable is fixedly connected, moving up and down below the release cable protector case.

The release cable protector case may include a hole-shaped entrance formed in the lower side of the release cable protector case and a lift bar attached to a side of the cable-fixing body and moving up and down to enter and exit the hole-shaped entrance.

The cable-operating lever may have a guide inclined downwardly on the upper surface of the cable-operating lever toward the outside handle to guide the release cable protector case when the release cable protector case returns to an original position.

The apparatus for preventing a vehicle door from opening according to the present disclosure has the following effects:

First, the release cable is preventing from pulling due to the forward and reverse inertia force by a simple structure to prevent the door from opening during the side collision.

Second, the existing balance weight and the existing blocking lever are eliminated, thus reducing costs and weight.

Third, since the existing balance weight is removed, user convenience on manipulation of the outside handle may be improved.

Fourth, even when an outer panel of the vehicle door is deformed and the outside handle offsets from a normal operating path, the door may be prevented from opening since the outside handle moves in a direction where the release cable is not pulled.

BRIEF DESCRIPTION OF THE DRAWINGS

The above and other features of the present inventive concept will now be described in detail with reference to certain exemplary embodiments thereof illustrated the accompanying drawings which are given hereinbelow by way of illustration only, and thus are not limitative of the present disclosure.

Figure 1:
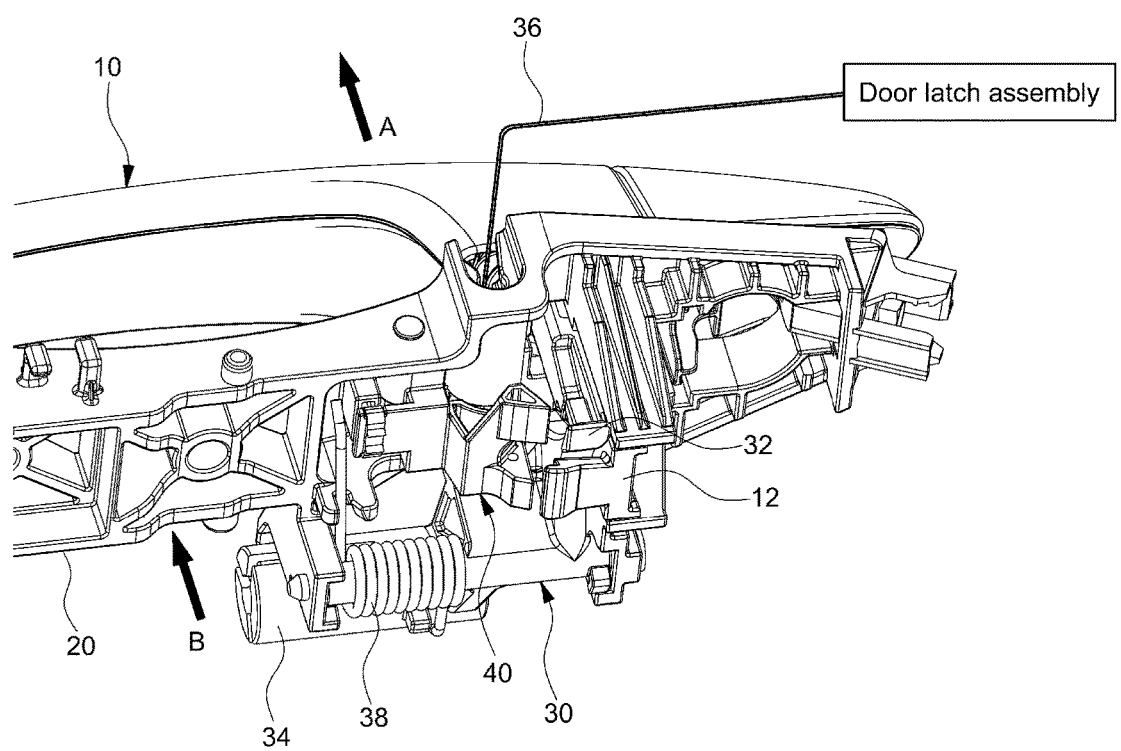
FIGS. 1 and 2 are perspective views showing an existing apparatus for preventing a door from opening at a side collision.
Figure 2:
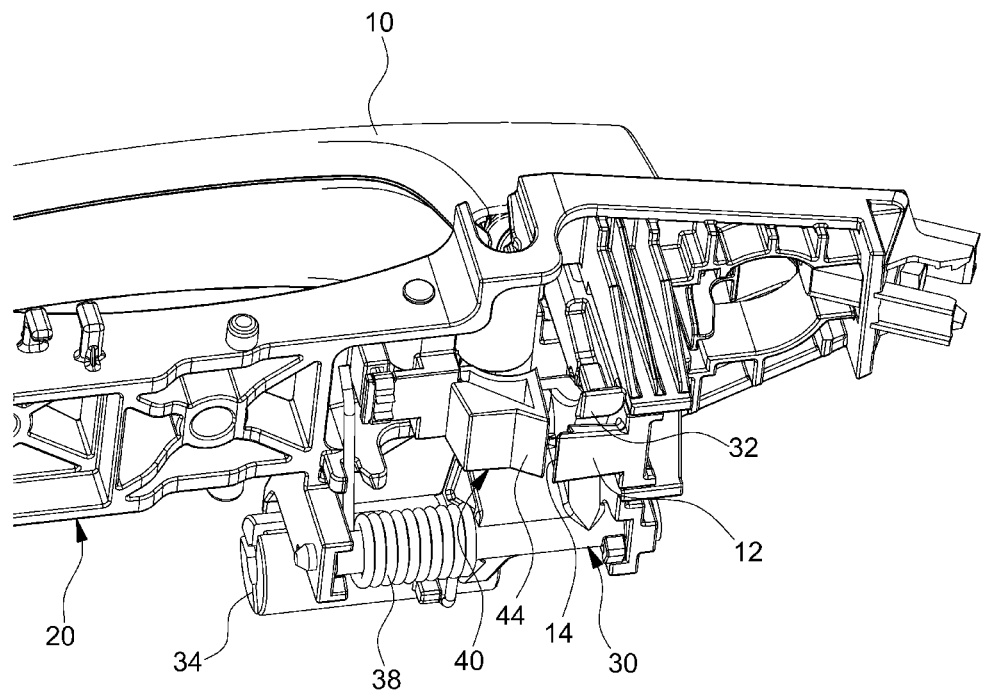
Figure 3:
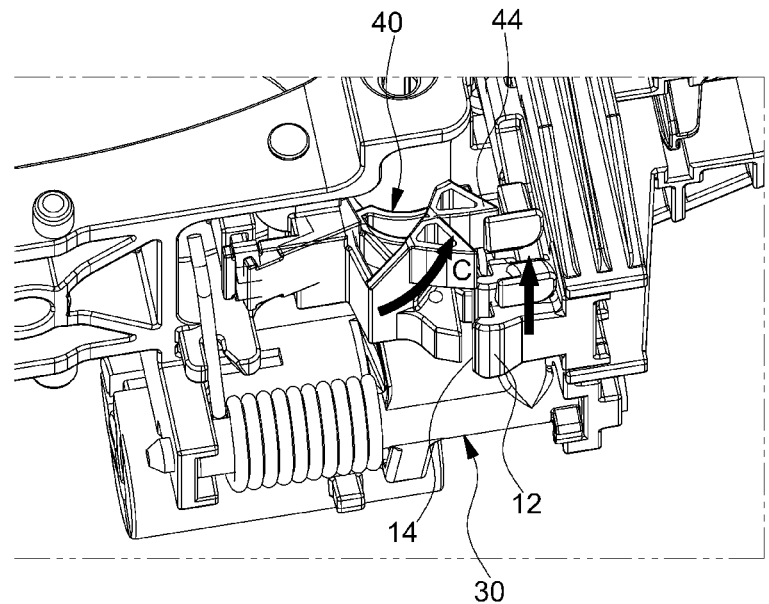
FIGS. 3 and 4 are a perspective view and a sectional view showing the existing apparatus prevents a door from opening at the side collision.
Figure 4:
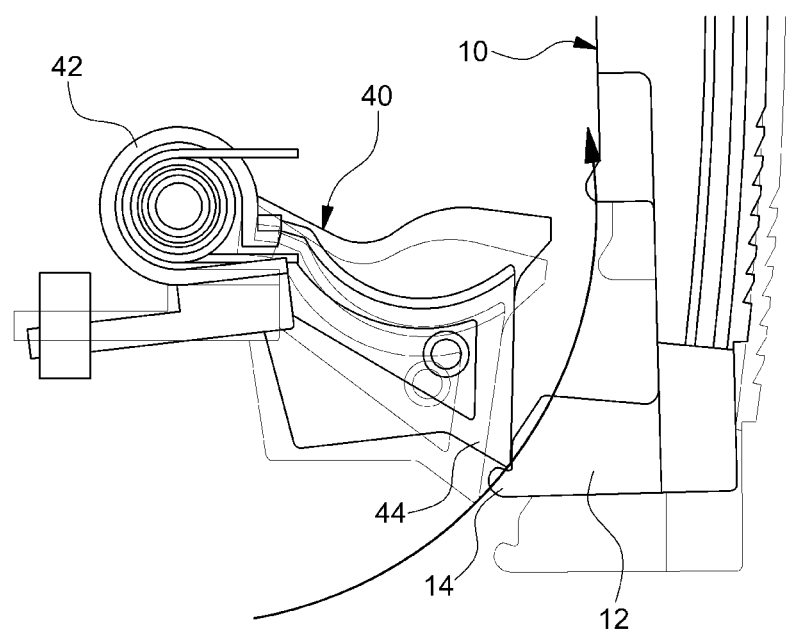

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, the present disclosure will be described in detail so that those skilled in the art to which the present disclosure pertains can easily carry out the present disclosure.

The present disclosure provides an apparatus for preventing a vehicle door having outside handle from opening when the outside handle pivots in a door opening direction by an inertia force due to side collision without pulling a release cable in a door releasing direction while a forward inertia force and a reverse inertia force are applied.

Figure 5:
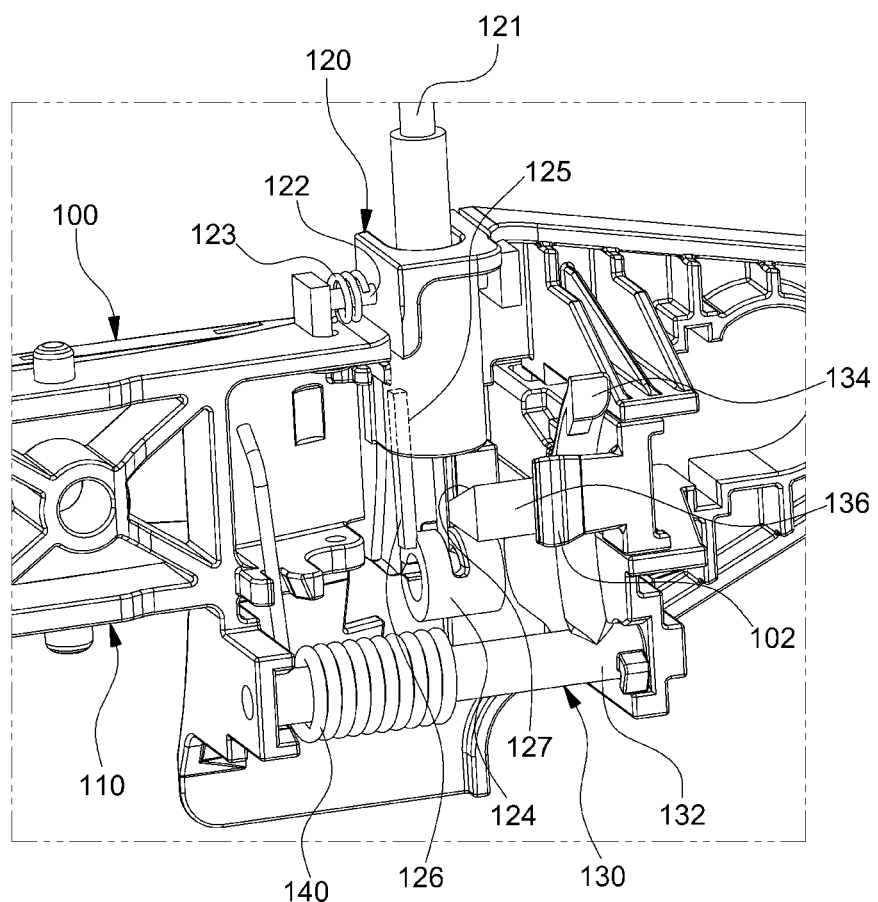
FIG. 5 is a perspective view showing a normal state of an apparatus for preventing a vehicle door having an outside handle opening according to an embodiment of the present inventive concept.
Figure 6:
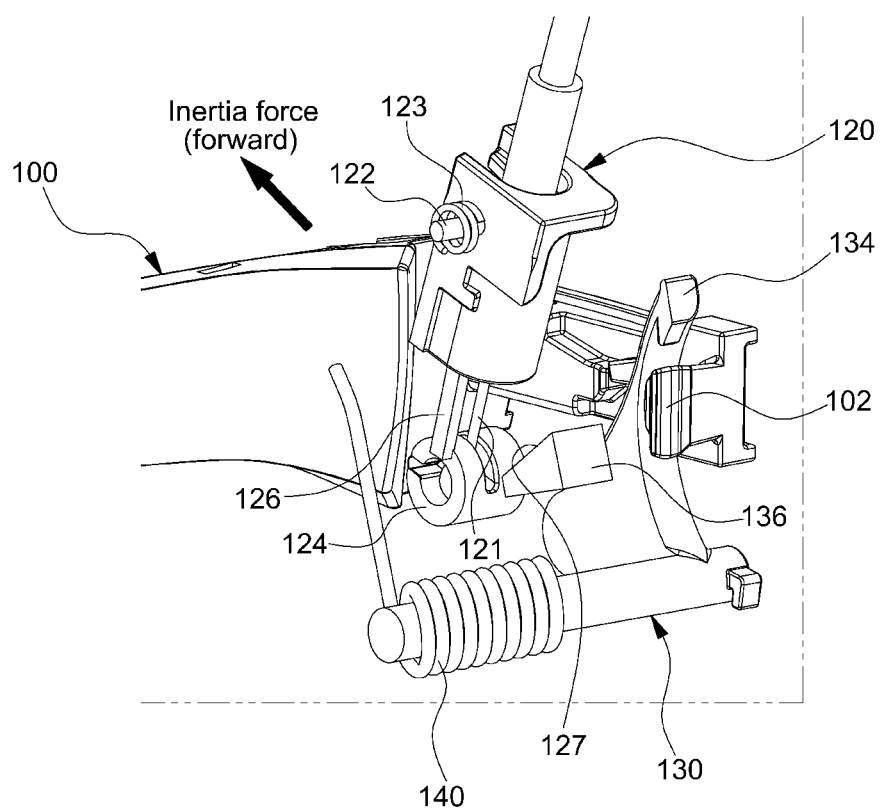
FIG. 6 is a perspective view showing operations of the apparatus for preventing a vehicle door from opening according to the embodiment of the present inventive concept.

FIG. 5 is a perspective view showing an apparatus for preventing a vehicle door having an outside handle from opening according to an embodiment of the present inventive concept. FIG. 6 is a perspective view showing operations of the apparatus for preventing a vehicle door from opening according to an embodiment of the present inventive concept.

Referring to FIGS. 5 and 6, an apparatus for preventing a vehicle door from opening includes an outside handle 100 and a housing 110 to which the outside handle 100 is attached.

The outside handle 100 is attached to an outer side of the housing 110 to be pulled. A pulling lever 102 is connected to the outside handle 100 and extends therefrom into the housing 110.

In a lower side of the housing 110, a handle-associated lever 130 is attached to pivot when pulling the outside handle 100 and to return the outside handle 100 to an original position.

The handle-associated lever 130 includes a rotary shaft 132 connected to the lower side of the housing 110 to rotate. A locking lever 134 extends from the rotary shaft 132 upwardly and is in contact with an outer surface of the pulling lever 102 which is connected to the outside handle 100. A cable-operating lever 136 is connected to an edge of the locking lever 134 to pull a release cable 121 which extends from a door latch assembly (not shown) in a door releasing direction.

Here, a first return spring 140 surrounds the rotary shaft 132 to provide a resilient force to the handle-associated lever 130. An end of the first return spring 140 is fixed to the rotary shaft 132, and another end thereof is fixed to the housing 110 to pull the handle-associated lever 130 by the outside handle 100 return back to the original position.

In an upper side of the housing 110, a release cable protector case 120 is hingedly connected to the housing 110 and pivots by an inertia force during the side collision.

The release cable protector case 120 serves as a path through which a release cable 121 extending from the door latch assembly passes to prevent the release cable 121 from being pulled in a door locking direction.

Both upper ends of the release cable protector case 120 are hinged to the upper side of the housing 110 by a hinge shaft 122 so that a lower side of the release cable protector case 120 may pivot about a hinged point inward and outward.

Since a second return spring 123, which has a smaller resilient force than that of the first return spring 140, surrounds the hinge shaft 122, the second return spring 123 provides an inward resilient force to the lower side of the release cable protector case 120.

In the lower side of the release cable protector case 120, a cylindrical cable fixing body 124, to which the release cable 121 is fixed, is mounted to the housing 110 to move upward and downward.

A hole-shaped entrance 125 is formed in a bottom portion of the release cable protector case 120. A lift bar 126 is mounted to a side of the cable fixing body 124 and moves up and down to come into and out of the entrance hole-shaped 125.

As the cable fixing body 124 moves downwards, the lift bar 126 comes out from the entrance 125, while the release cable 121 is lifted to the original position by a cable returning force applied from the door latch assembly when the release cable 121 is released. Simultaneously, the cable fixing body 124 is lifted, and thus, the lift bar 126 moves upwards and enters the entrance 125.

The cable-operating lever 136 of the handle-associated lever 130 has a rectangular block-like shape, in that a bottom portion thereof is in contact with a top portion of the cable fixing body 124 to pull the release cable 121 in the door releasing direction when the cable-operating lever 136 pushes the cable fixing body 124.

The cable-operating lever 136 has a guide 127 inclined downwardly toward the outside handle 100 at an upper surface of the cable-operating lever 136. The release cable protector case 120 can return to the original position after rotating forward by an inertia force at the side collision.

Here, operations of the apparatus for preventing a vehicle door having an outside handle from opening according to an embodiment of the present inventive concept configured as described above will be described.

Normal Door Opening

As shown in FIG. 5, for general door opening, the cable-operating lever 136 of the handle-associated lever 130 is on the cable fixing body 124 in contact therewith to push.

First, when a user pulls the outside handle 100 in a door opening direction, the pulling lever 102 integrally with the outside handle 100 is pulled, and simultaneously, the locking lever 134 of the handle-associated lever 130 overlapped with an outer surface of the pulling lever 102 is pulled outwardly.

Next, the rotary shaft 132 and the cable-operating lever 136 pivot counterclockwise, that is, in a direction where the release cable 121 is pulled in a door releasing direction, simultaneously with pulling of the locking lever 134 of the handle-associated lever 130 outwardly.

When the cable-operating lever 136 pivots counterclockwise, the cable fixing body 124 is pressed downwardly such that the cable fixing body 124 descends and the release cable fixed to the cable fixing body 124 is pulled in the door releasing direction.

Thus, the door latch assembly (not shown), to which the release cable 121 is connected, is released, and the door is open by which a user further pulls the outside handle 10 held by the user.

Prevention of Door Opening at Side Collision

In a case of a side collision, as shown in FIG. 6, a lower side of the release cable protector case 120 pivots outward first before the outside handle 100 is pulled in the door opening direction due to a forward inertia force.

In other words, the lower side of the release cable protector case 120 pivots outwardly about the upper hinge shaft 122 before the outside handle 100 pivots.

The release cable protector case 120 pivots firstly before the outside handle 100 since mass of the release cable protector case 120 is less than that of the outside handle 100 and a resilient returning force of the second return spring 123 coupled around the hinge shaft 122 is less than that of the first return spring 140.

Thus, even when the outside handle 100 is pulled by the forward inertia force and the locking lever 134 of the handle associated lever 130 is pulled outwardly, the cable-operating lever of the handle associated lever 130 cannot push the cable fixing body 124 since the release cable protector case 120 and the cable fixing body 124 in the lower side thereof are already pivoted outwardly.

Since the cable-operating lever 135 cannot push the cable fixing body 124, the release cable 121 fixed to cable fixing body 124 cannot be pulled in a door releasing direction, thus preventing the door from being released and opening.

When a reverse inertia force is applied or a door is closed directly after the forward inertia force is applied at the side collision, the handle associated lever 130 pivots clockwise by the resilient returning force of the first return spring 140. Then, the cable-operating lever 136 of the handle-associated lever 130 is positioned on the cable-fixing body 124.

Here, since the cable-operating lever 136 has the inclined guide 127, the inclined guide 127 slides in a contact with the cylindrical cable-fixing body 124 when the handle-associated lever 130 including the cable-operating lever 136 pivots clockwise. The cable-operating lever 136 may easily return to the cable-fixing body 124.

Although the present disclosure has been described in detail until now, the scope of the present disclosure is not limited to the description but various modifications made by those skilled in the art using the basic concept of the present disclosure defined by the claims also fall within the scope of the present disclosure.

What is claimed is:

1. An apparatus for preventing a vehicle door from opening, the apparatus comprising:
    an outside handle having a pulling lever which extends from the outside handle into a housing;
    a release cable protector case hingedly connected to an upper side of the housing to pivot;
    a release cable connected to a lower side of the release cable protector case to be pulled;
    a handle-associated lever including a rotary shaft which is pivotally attached to a lower side of the housing, a locking lever which extends from the rotary shaft and is in contact with an outer surface of the pulling lever, and a cable-operating lever which is connected to an edge of the locking lever and pulls the release cable;
    a first return spring, which surrounds the rotary shaft of the handle-associated lever, having one end fixed to the rotary shaft and another end fixed to the housing; and
    a second return spring surrounding a hinge shaft of the release cable protector case, wherein the second return spring has a resilient return force less than that of the first return spring to provide an inward resilient force to the lower side of the release cable protector case.

2. The apparatus of claim 1, further comprising a cable fixing body, to which the release cable is fixedly connected, moving up and down below the release cable protector case.

3. The apparatus of claim 2, wherein the release cable protector case includes: a hole-shaped entrance formed in the lower side thereof; and a lift bar attached to a side of the cable-fixing body and moving up and down to enter and exit the hole-shaped entrance.

4. The apparatus of claim 2, wherein cable fixing body has a guide hole through which the release cable passes and is fixed to the cable fixing body.

5. The apparatus of claim 1, wherein the cable-operating lever has a guide inclined downwardly on the upper surface thereof toward the outside handle to guide the release cable protector case when the release cable protector case returns to an original position.

* * * * *